United States Patent
Guyer et al.

(10) Patent No.: US 11,484,935 B2
(45) Date of Patent: Nov. 1, 2022

(54) COMPOSITIONS AND METHODS FOR REFRACTORY COATINGS WITH ESTER CARRIERS

(71) Applicant: HA-International, LLC, Westmont, IL (US)

(72) Inventors: Orville B. Guyer, Emmett, ID (US); Kim M. Delgado, Toledo, OH (US); Mitchell A. Patterson, Shorewood, IL (US); Flavia C. Duncan, Homer Glen, IL (US); Daniel D. Cygal, Lemont, IL (US); Gary D. Haynes, Clarendon Hills, IL (US)

(73) Assignee: HA-INTERNATIONAL, LLC, Westmont, IL (US)

( * ) Notice: Subject to any disclaimer, the term of this patent is extended or adjusted under 35 U.S.C. 154(b) by 326 days.

(21) Appl. No.: 16/039,200

(22) Filed: Jul. 18, 2018

(65) Prior Publication Data
US 2019/0022741 A1    Jan. 24, 2019

Related U.S. Application Data

(60) Provisional application No. 62/534,082, filed on Jul. 18, 2017, provisional application No. 62/557,291, filed on Sep. 12, 2017.

(51) Int. Cl.
*B22C 3/00*  (2006.01)
*C04B 41/50*  (2006.01)
*C04B 35/48*  (2006.01)

(52) U.S. Cl.
CPC .............. *B22C 3/00* (2013.01); *C04B 35/481* (2013.01); *C04B 41/5042* (2013.01); *C04B 2235/3244* (2013.01); *C04B 2235/5436* (2013.01)

(58) Field of Classification Search
CPC .............. B22C 3/00; C04B 2235/3244; C04B 2235/5436; C04B 35/481; C04B 41/5042
See application file for complete search history.

(56) References Cited

U.S. PATENT DOCUMENTS 3,115,414 A * 12/1963 Lottridge, Jr. ............ B22C 3/00
                                                    106/38.23
3,137,046 A    6/1964 Barlow et al.
(Continued)

FOREIGN PATENT DOCUMENTS

KR    100928140    11/2009
KR    101588826    3/2016
(Continued)

OTHER PUBLICATIONS

Form PCT/ISA/220, PCT Notification of Transmittal of the International Search Report and the Written Opinion of the International Search Authority, or the Declaration, PCT/US2018/042752, dated Sep. 24, 2018.
(Continued)

*Primary Examiner* — Shuangyi Abu Ali
(74) *Attorney, Agent, or Firm* — Clark Hill PLC (57) ABSTRACT

This technology relates to refractory coatings used in metal casting by the foundry industry. Refractory coatings are often used to coat foundry cores and molds for the purpose of improving the quality of castings formed in connection with the cores or molds, particularly at the surface of the casting. Whereas traditional coatings comprise water based solvents that require excessive drying times or HAPs that emit hazardous VOCs, preferred embodiments of the present invention comprise refractory coatings having VOC-exempt ester based solvents, such as DMC. Other preferred embodiments of the present invention comprise methods for reduction of VOC content in a foundry article.

9 Claims, 10 Drawing Sheets

(56) References Cited

U.S. PATENT DOCUMENTS

| | | | |
|---|---|---|---|
| 4,506,041 | A | 3/1985 | Tanigawa et al. |
| 5,512,523 | A | 4/1996 | Ono et al. |
| 7,759,268 | B2 | 7/2010 | Lu et al. |
| 8,889,778 | B2 | 11/2014 | Duraisamy |
| 9,029,475 | B2 | 5/2015 | Yokoyama et al. |
| 2010/0099806 | A1 | 4/2010 | Houze et al. |
| 2010/0224755 | A1* | 9/2010 | Stotzel ............... B22C 3/00 249/114.1 |
| 2012/0121921 | A1* | 5/2012 | Cosyns ............... C04B 24/2641 428/522 |
| 2014/0255326 | A1 | 9/2014 | Pasin et al. |
| 2016/0137841 | A1* | 5/2016 | Warnshuis ............ C08L 83/02 524/108 |

FOREIGN PATENT DOCUMENTS

| | | |
|---|---|---|
| WO | 2002064687 | 8/2002 |
| WO | 2012014154 | 2/2012 |
| WO | 2015175091 | 11/2015 |

OTHER PUBLICATIONS

Dow Coating Materials Offers Dimethyl Carbonate Pre-Mix for Low-VOC Concrete Coatings, Press Release, Feb. 8, 2012, The Dow Chemical Company, Philadelphia, http://coatings.dow.com/en/news-and-events/press-releases/2012/20120208a.

DMC dimethyl carbonate, Product Information Sheet, Aug. 8, 2016, Kowa American Corporation, New York, nttp://www.kowachemical.com/product/dimethyl-carbonate.

* cited by examiner

COMPOSITIONS AND METHODS FOR REFRACTORY COATINGS WITH ESTER CARRIERS

CROSS REFERENCE TO RELATED APPLICATIONS

This application claims priority to, and the benefit of, U.S. Provisional Patent Application Ser. Nos. 62/534,082, filed on Jul. 18, 2017 and 62/557,291 filed on Sep. 12, 2017.

FIELD OF THE INVENTION

This technology relates to refractory coatings used in metal casting by the foundry industry.

BACKGROUND OF THE INVENTION

In many respects, refractory coatings are like special paints used in metal casting. Unlike conventional paints, however, refractory coatings can withstand the high temperatures of molten metal and also act as a barrier between the molten metal and a mold into which the metal is poured for casting.

Refractory coatings are generally comprised of a high temperature mineral, or other substance that is resistant to heat, suspended in a liquid (solvent) carrier. The coating is applied to, for example, a sand mold or core surface prior to casting. The liquid carrier is removed by evaporation, while the layer of mineral is left behind to coat the mold surface. This layer can help prevent penetration of molten metal into the sand, prevent erosion of the sand, and otherwise improve the quality of a casting surface.

Foundries typically employ either a water based or solvent based coating. Water requires energy and equipment intensive drying, but it is environmentally friendly. Solvent based coatings can be air dried in a reduced amount of time or ignited for very short dry times. Current solvent based foundry refractory coatings comprise of isopropyl alcohol ("IPA"), ethanol, methanol, naphtha, etc. However, some of these solvent based systems comprise hazardous air pollutants ("HAPs") and all of them comprise volatile organic compounds ("VOCs"). IPA and ethanol are the most commonly used solvent carriers in refractory coatings of the foundry industry. Such pollutants and volatile compounds are subject to intense regulation, and many foundries that use conventional solvent based coatings spend considerable time and resources permitting for the VOCs.

Some VOC-exempt solvents such as acetone have been used in the past. However, acetone's high evaporation rate increases usage, and the low flash point introduces serious explosion and fire risks to the foundry.

Therefore, there is an unmet need in the prior art for a solvent based refractory coating for use in the foundry industry, wherein the coating provides suitable performance characteristics, but is much safer to use and does not require additional permitting or include restrictions that accompany traditional solvent based coatings.

SUMMARY OF THE INVENTION

To meet the needs described above, the present invention provides a partial or full replacement of refractory coating solvents with ester carriers, such as dimethyl carbonate ("DMC") or t-butyl acetate, to form a solvent based refractory coating with reduced or no reportable HAPs or VOCs.

In one preferred embodiment of the present invention, a refractory coating (also known as mold wash, paint, or dressing) composition is provided preferably comprising a liquid ester carrier, such as 100% DMC, a suspending agent, a binding agent, water, an additive, and a particulate refractory filler blend.

In operation, it has been found that refractory coatings formed in accordance with a preferred embodiment of the present invention comprising DMC achieved an approximately 50% -97% reduction in reportable VOC's as compared to conventional refractory coatings. Notably, 100% VOC exempt coatings are achievable in accordance with preferred embodiments of the present invention, although some coatings formed as described herein may include trace VOCs that are introduced to the composition by the binding agent.

As described herein, the term "carrier solvent" may comprise one or more ester carriers or a combination of one or more ester carriers with non-ester solvents.

Examples of additives are surface active agents, such as, wetting agents, defoamers, dispersants, and rheology modifiers.

A preferred embodiment of the present invention is:

a refractory coating composition for foundry use comprising:

a liquid carrier comprising an ester carrier, the ester carrier being provided at approximately 25% to 100% by weight of the liquid carrier and 20% to 80% by weight of the composition;

a suspending agent provided at 2% or less by weight of the composition;

a binder provided at approximately 1.5% to 3% by weight of the composition;

water provided at up to approximately 2% by weight of the composition;

one or more additives provided at approximately 2% or less by weight of the composition;

and a particulate refractory material provided at approximately 13 to 78.5% by weight of the composition.

An alternative preferred embodiment of the present invention is: a method for reduction of the VOC content in a foundry article, the method comprising the steps of:

forming a foundry article;

forming a refractory coating composition comprising an liquid carrier having an ester carrier;

diluting the composition with a VOC-exempt solvent;

applying the composition to the foundry article;

drying the composition to remove the ester carrier;

wherein the composition comprises: the ester carrier being provided at approximately 25% to 100% by weight of the liquid carrier and approximately 20% to 80% by weight of the composition; a suspending agent provided at up to approximately 2% by weight of the composition; a binder provided at approximately 1.5% to 3% by weight of the composition; water provided at up to approximately 2% by weight of the composition; one or more additives provided at up to approximately 2% by weight of the composition; and a particulate refractory material provided at approximately 13 to 78.5% by weight of the composition.

Another alternative preferred embodiment of the present invention is:

A method for reduction of VOC content in a foundry article, the method comprising the steps of:
providing a refractory coating composition having a solvent carrier that comprises VOCs; and
diluting the composition with a VOC-exempt solvent.

DETAILED DESCRIPTION OF THE EMBODIMENTS

Figure 1:
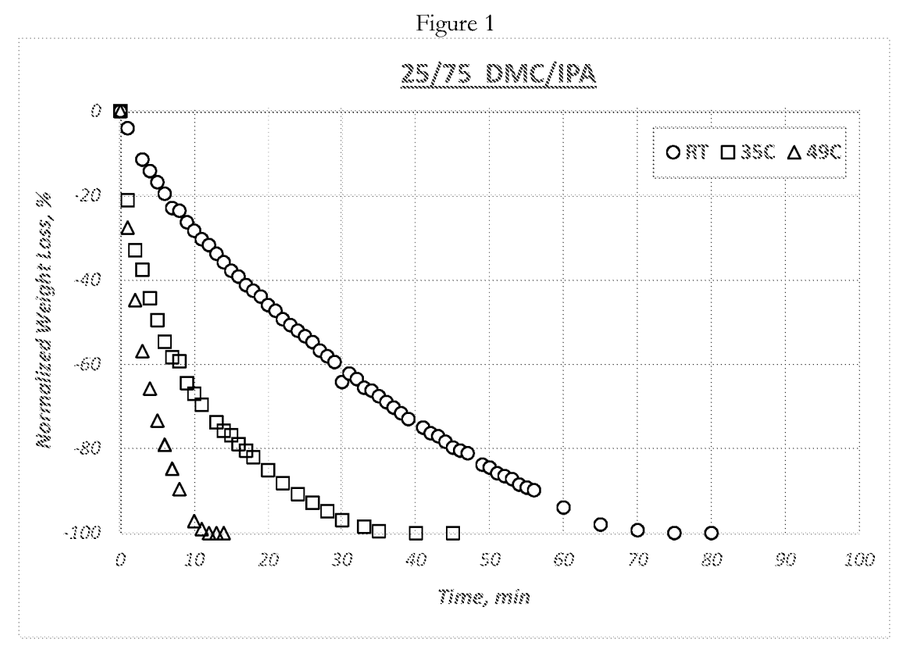
FIG. 1 is a graphic representation of weight loss % over time in minutes (drying time) data produced from a refractory coating comprising an approximately 25/75 DMC/IPA (1:3 ratio DMC:IPA) ester carrier formulation. As shown, the data was collected at room temperature ("RT"), 35 degrees Celsius, and 49 degrees Celsius.
Figure 2:
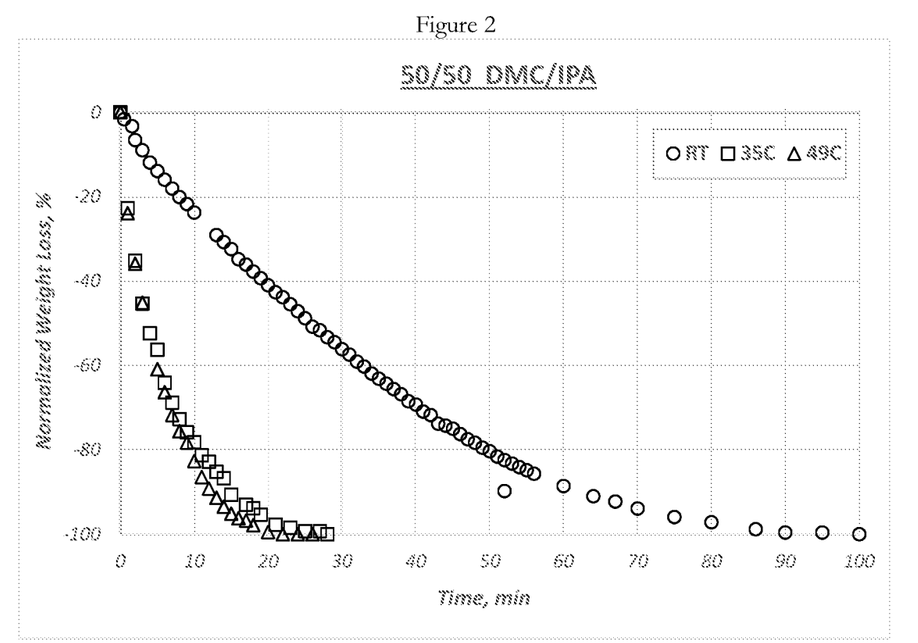
FIG. 2 is a graphic representation of weight loss % over time in minutes (drying time) data produced from a refractory coating comprising an approximately 50/50 DMC/IPA ester carrier formulation. As shown, the data was collected at RT, 35 degrees Celsius, and 49 degrees Celsius.
Figure 3:
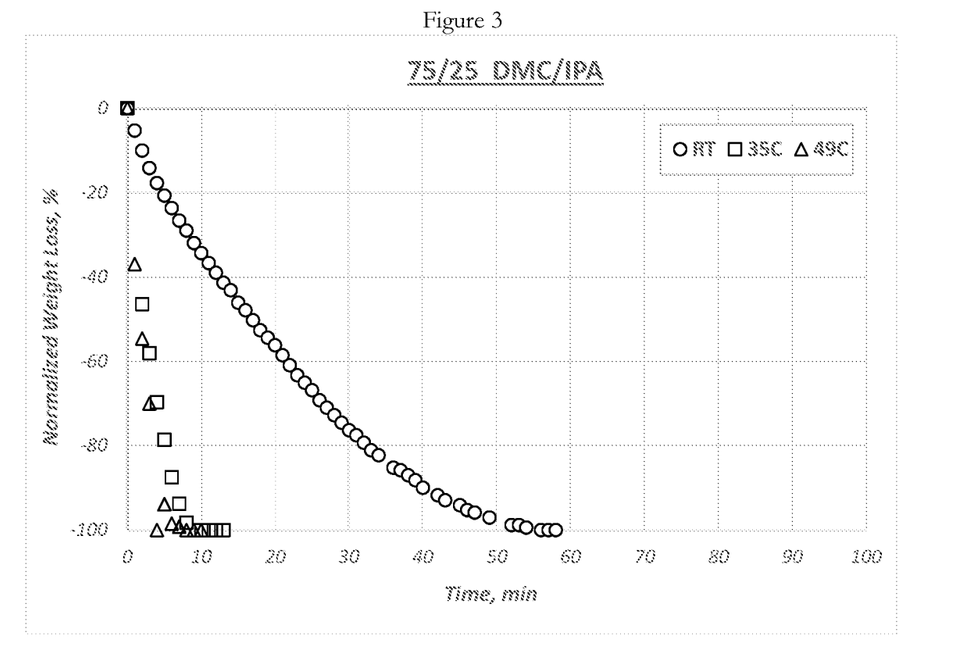
FIG. 3 is a graphic representation of weight loss % over time in minutes (drying time) data produced from a refractory coating comprising an approximately 75/25 DMC/IPA ester carrier formulation. As shown, the data was collected at RT, 35 degrees Celsius, and 49 degrees Celsius.
Figure 4:
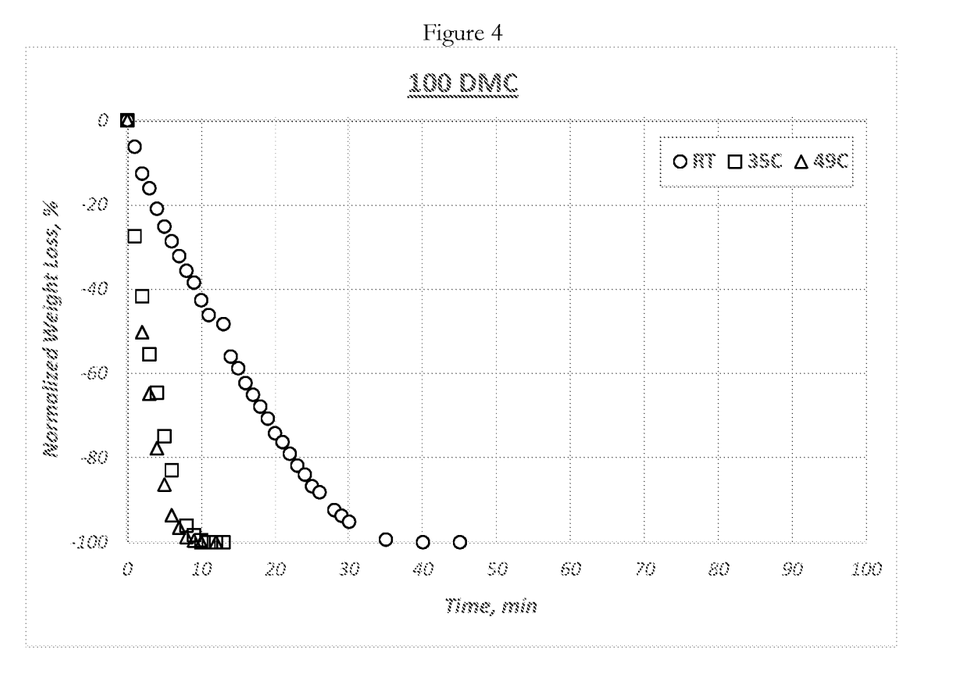
FIG. 4 is a graphic representation of weight loss % over time in minutes (drying time) data produced from a refractory coating comprising an approximately 100% DMC ester carrier formulation. As shown, the data was collected at RT, 35 degrees Celsius, and 49 degrees Celsius.
Figure 5:
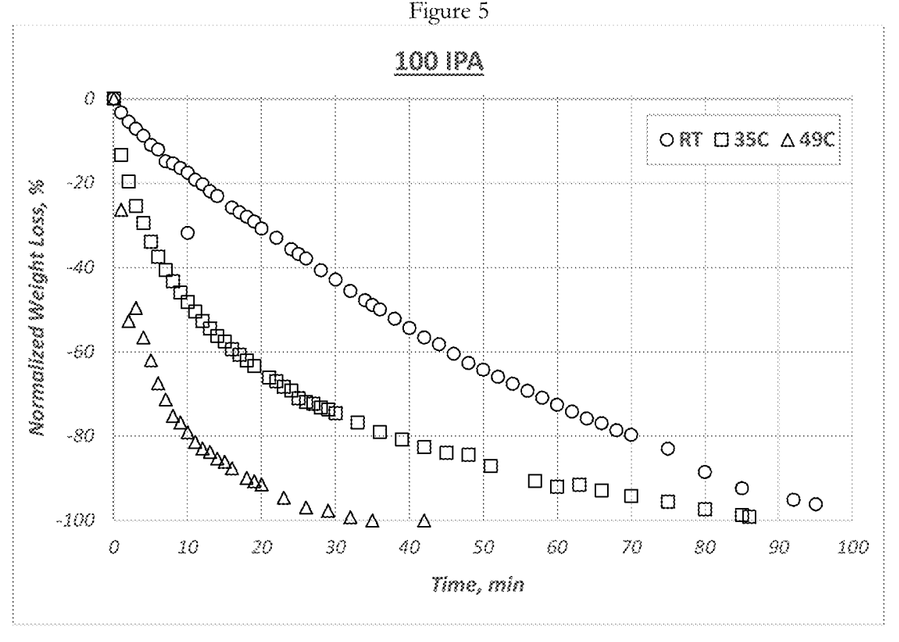
FIG. 5 is a graphic representation of weight loss % over time in minutes (drying time) data produced from a refractory coating comprising an approximately 100% IPA carrier formulation. As shown, the data was collected at RT, 35 degrees Celsius, and 49 degrees Celsius.
Figure 6:
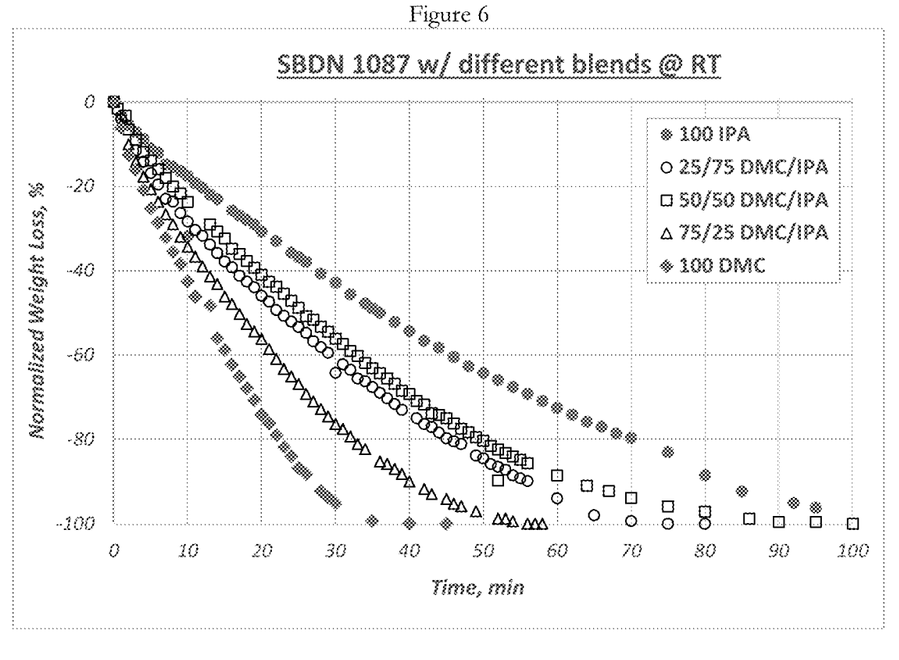
FIG. 6 is a graphic representation of weight loss% over time in minutes (drying time) data produced from a refractory coating comprising an SBDN 1087 base formula and various carrier solvents comprising DMC and IPA. As shown, the data was collected at RT.
Figure 7:
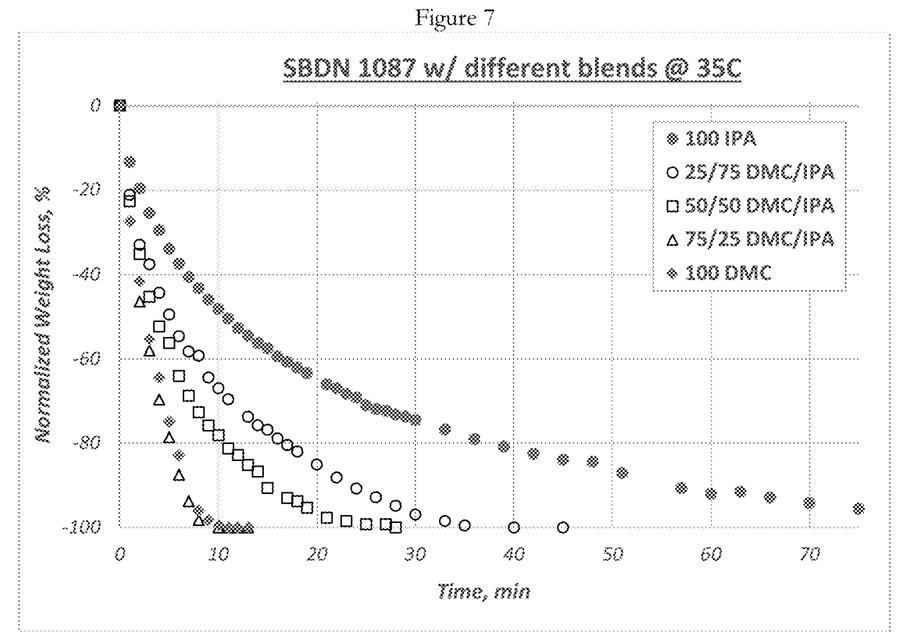
FIG. 7 is a graphic representation of weight loss % over time in minutes (drying time) data produced from a refractory coating comprising an SBDN 1087 base formula and various carrier solvents comprising DMC and IPA. As shown, the data was collected at 35 degrees Celsius.
Figure 8:
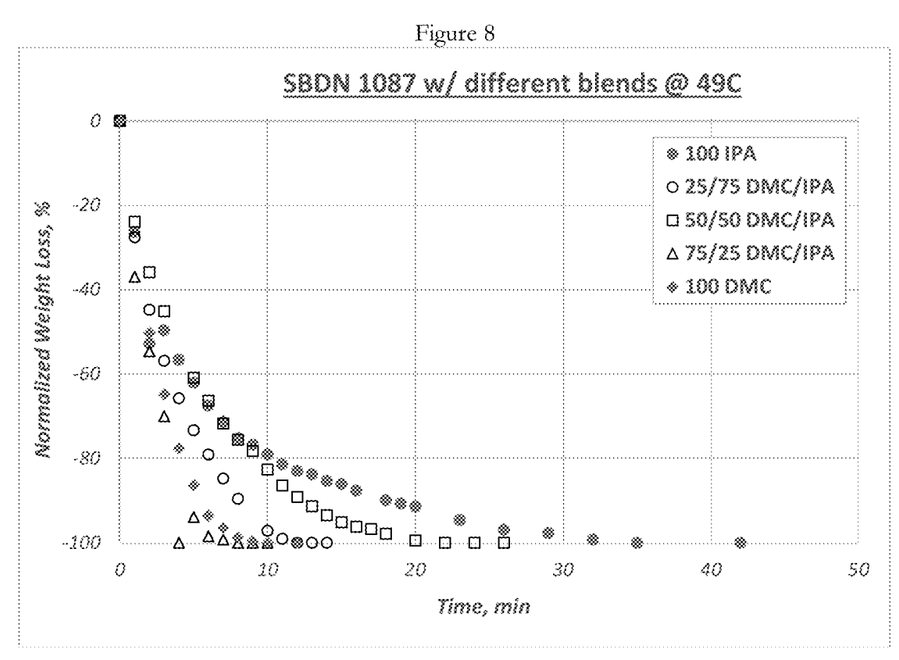
FIG. 8 is a graphic representation of weight loss % over time in minutes (drying time) data produced from a refractory coating comprising an SBDN 1087 base formula and various carrier solvents comprising DMC and IPA. As shown, the data was collected at 49 degrees Celsius.
Figure 9:
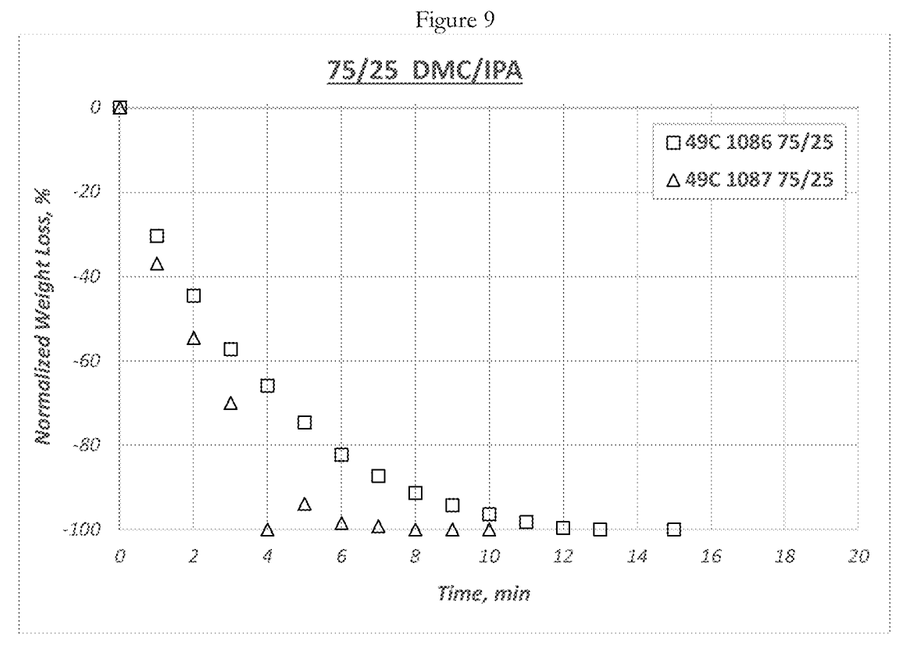
FIG. 9 is a graphic representation of weight loss % over time in minutes (drying time) data produced from a refractory coating comprising an SBDN 1086 or 1087 base formula and a carrier solvent comprising approximately 75/25 DMC/IPA. As shown, the data was collected at 49 degrees Celsius.
Figure 10:
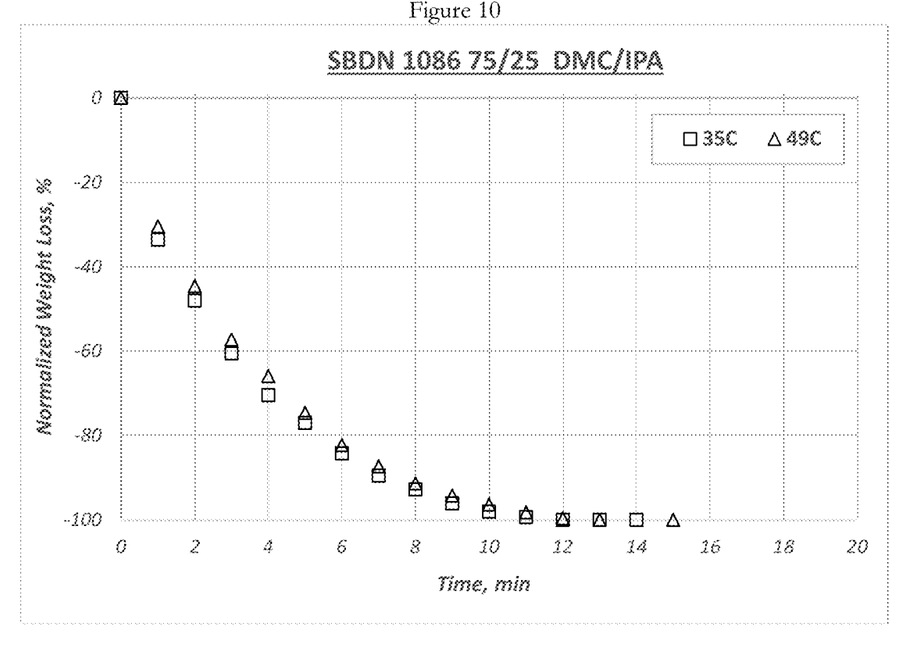
FIG. 10 is a graphic representation of weight loss % over time in minutes (drying time) data produced from a refractory coating comprising an SBDN 1086 base formula and a carrier solvents comprising approximately 75/25 DMC/IPA. As shown, the data was collected at 35 degrees Celsius and 49 degrees Celsius.
Figure 11:
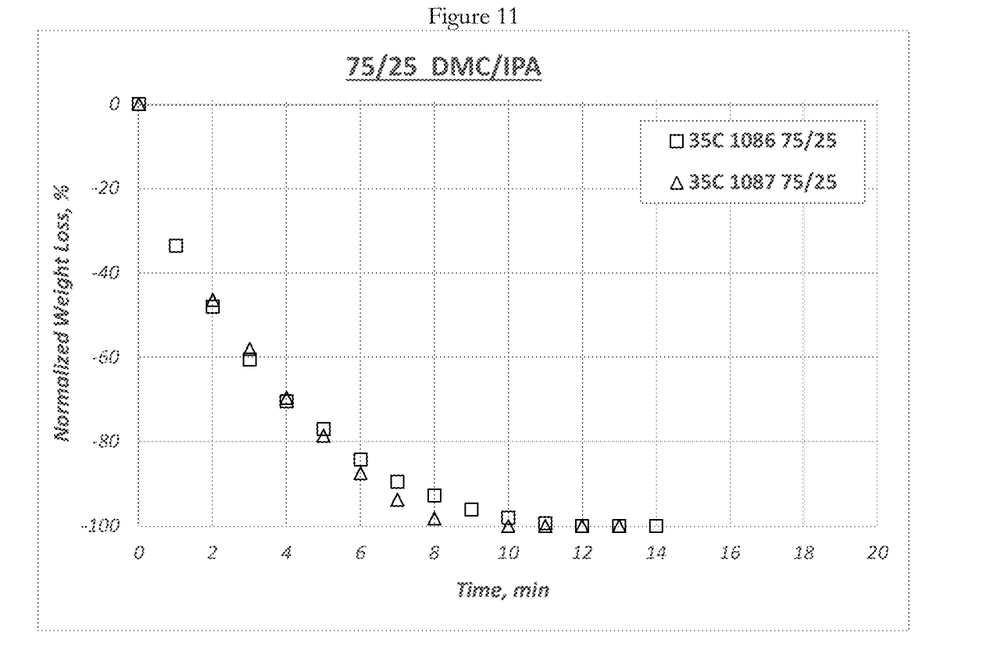
FIG. 11 is a graphic representation of weight loss % over time in minutes (drying time) data produced from a refractory coating comprising an SBDN 1086 or 1087 base formula and a carrier solvent comprising approximately 75/25 DMC/IPA. As shown, the data was collected at 35 degrees Celsius.
Figure 12:
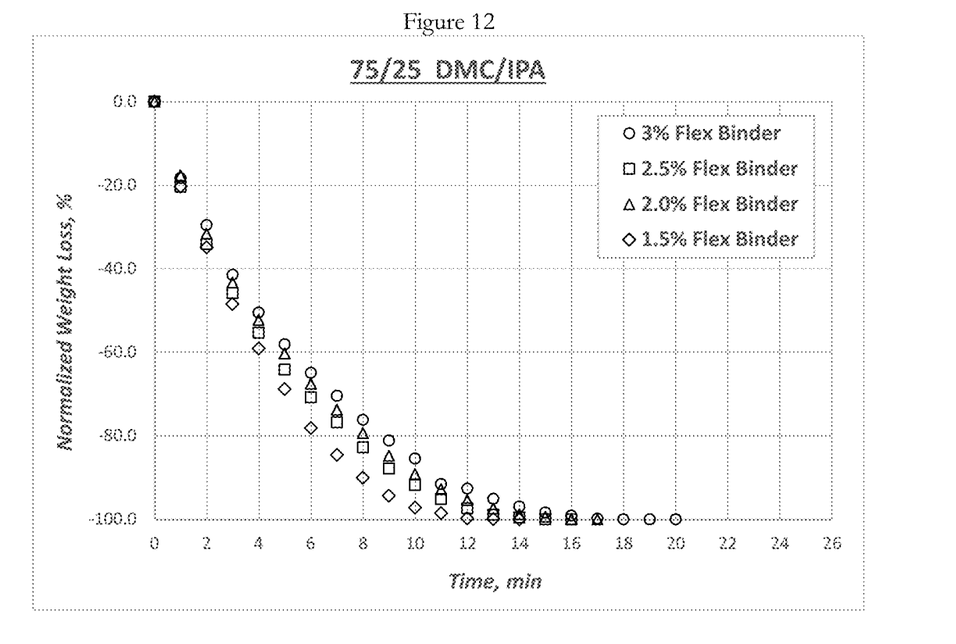
FIG. 12 is a graphic representation of weight loss % over time in minutes (drying time) data produced from a refractory coating comprising a carrier solvent comprising approximately 75/25 DMC/IPA and various % wt binder.
Figure 13:
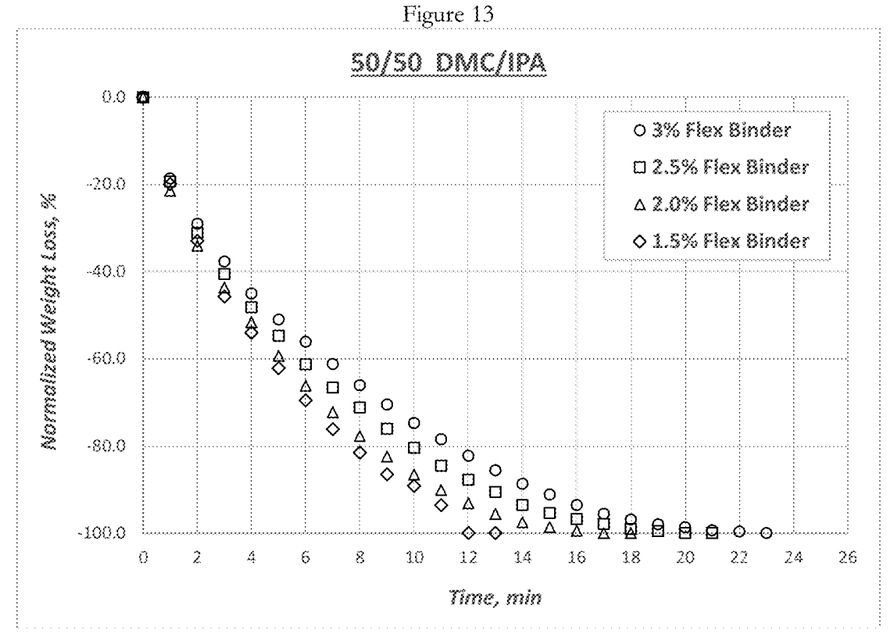
FIG. 13 is a graphic representation of weight loss % over time in minutes (drying time) data produced from a refractory coating comprising a carrier solvent comprising approximately 50/50 DMC/IPA and various % wt binder.
Figure 14:
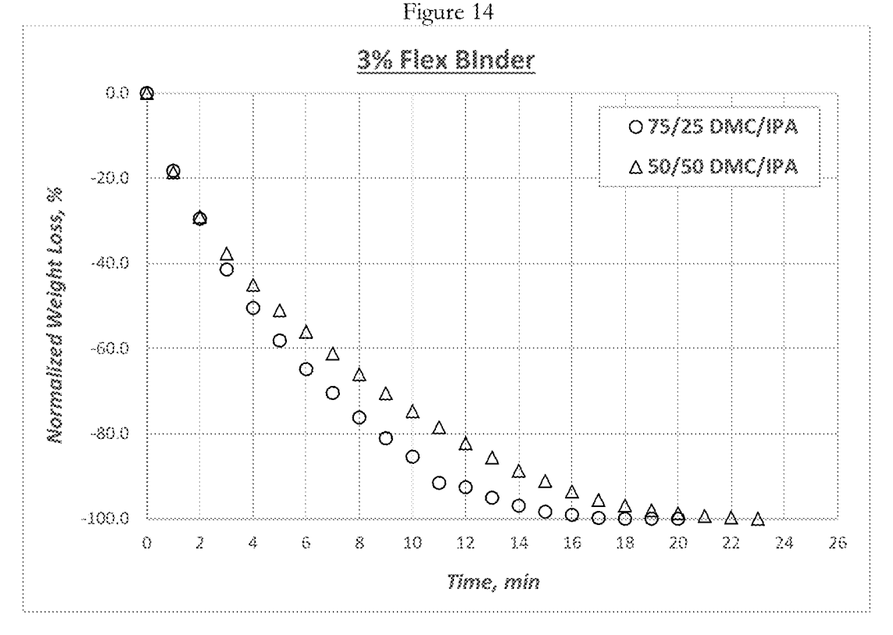
FIG. 14 is a graphic representation of weight loss % over time in minutes (drying time) data produced from refractory coatings comprising a carrier solvent comprising either approximately 75/25 or approximately 50/50 DMC/IPA and approximately 3% binder.
Figure 15:
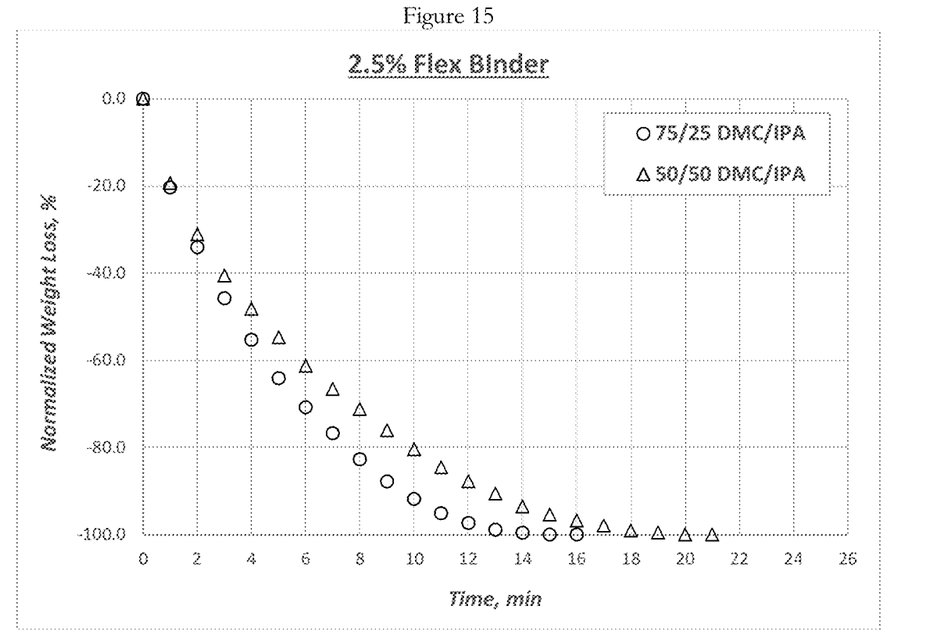
FIG. 15 is a graphic representation of weight loss % over time in minutes (drying time) data produced from refractory coatings comprising a carrier solvent comprising either approximately 75/25 or approximately 50/50 DMC/IPA and approximately 2.5% binder.
Figure 16:
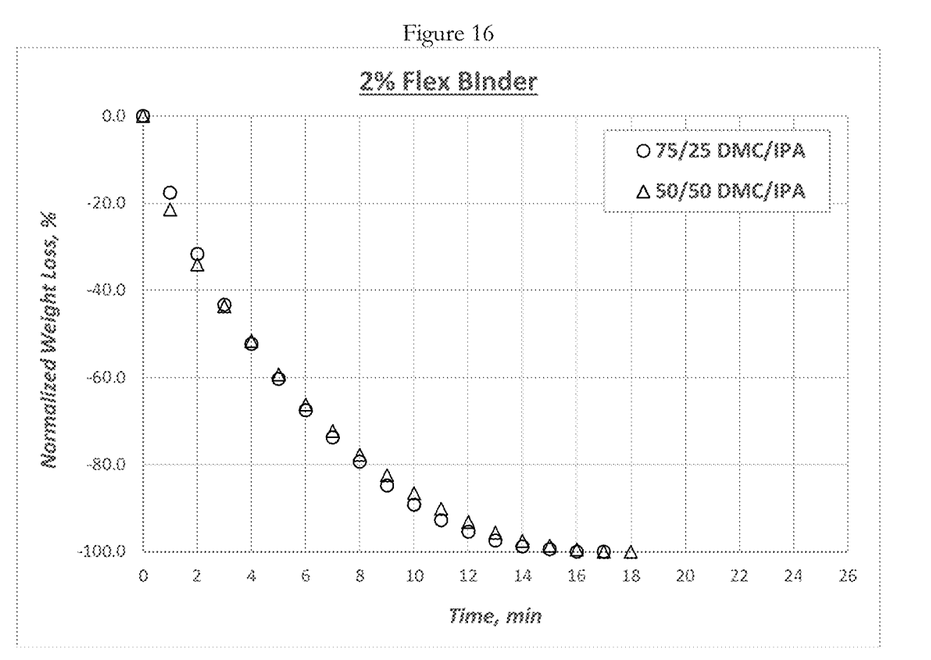
FIG. 16 is a graphic representation of weight loss % over time in minutes (drying time) data produced from refractory coatings comprising a carrier solvent comprising either approximately 75/25 or approximately 50/50 DMC/IPA and approximately 2% binder.
Figure 17:
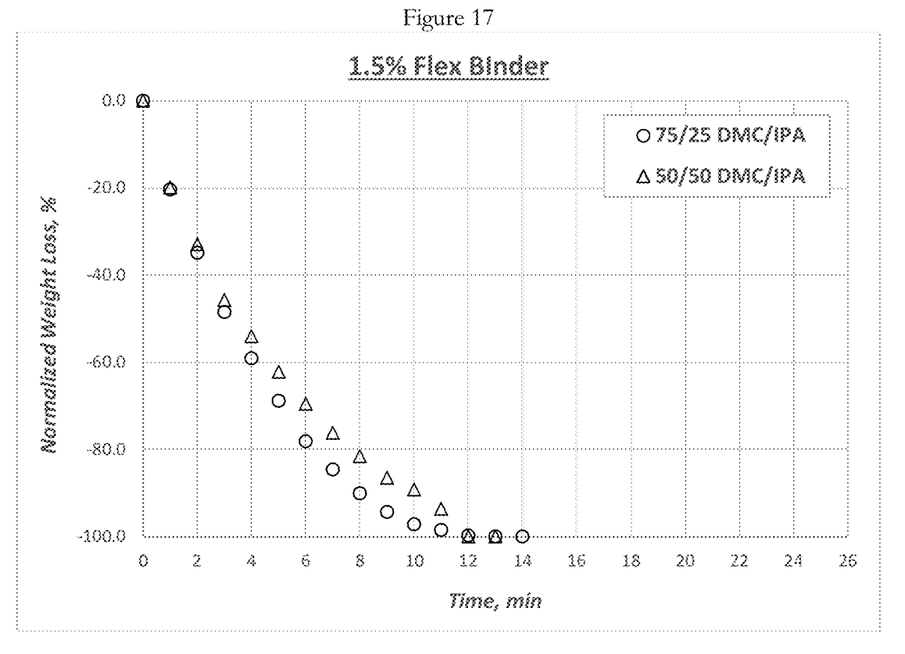
FIG. 17 is a graphic representation of weight loss % over time in minutes (drying time) data produced from refractory coatings comprising a carrier solvent comprising either approximately 75/25 or approximately 50/50 DMC/IPA and approximately 1.5% binder.
Figure 18:
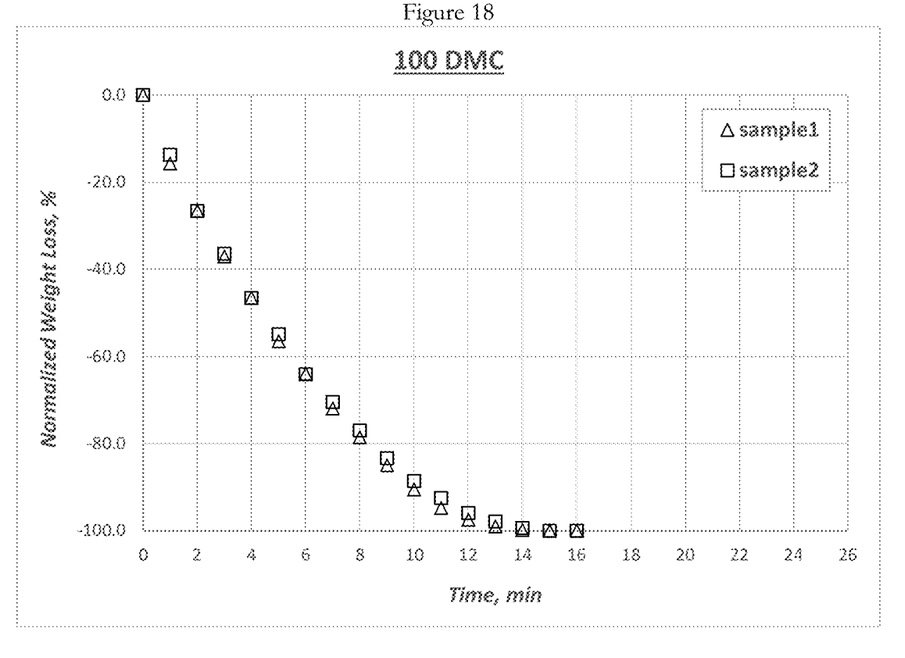
FIG. 18 is a graphic representation of weight loss % over time in minutes (drying time) data produced from refractory coatings comprising a carrier solvent comprising approximately 100% DMC and approximately 2% binder.
Figure 19:
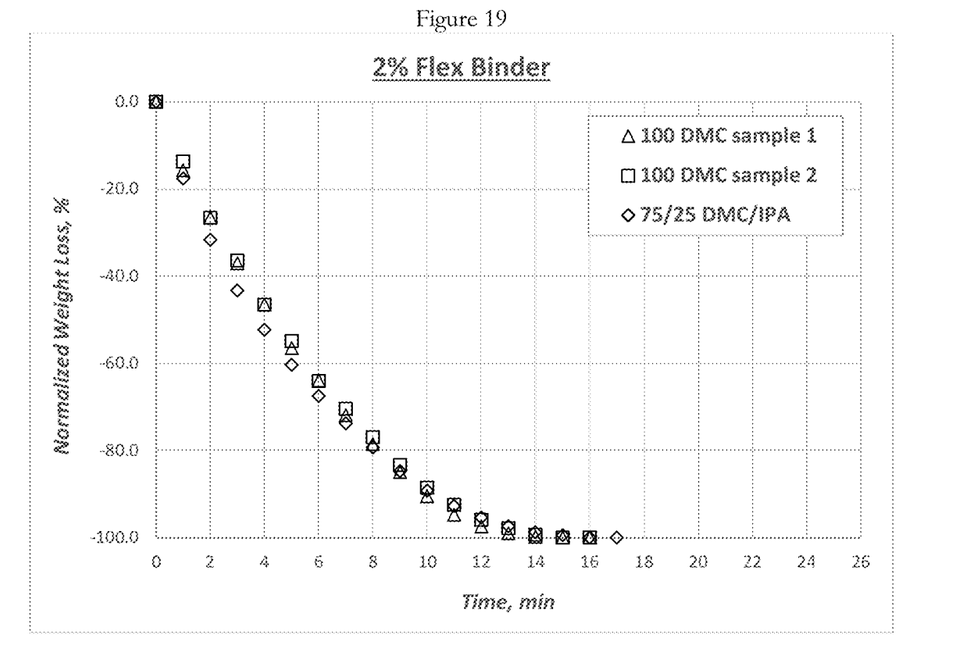
FIG. 19 is a graphic representation of weight loss (drying time) data produced from refractory coatings comprising a carrier solvent comprising either approximately 75/25 DMC/IPA or approximately 100% DMC and approximately 2% binder.

While the present invention may be susceptible to embodiment in different forms, there is described herein in detail, specific preferred embodiments with the understanding that the present disclosure is to be considered an exemplification of the principles of the invention, and is not intended to limit the invention to that described herein.

A preferred embodiment of the present invention comprises a low to absent VOC refractory coating having performance characteristics that are comparable to conventional solvent-based coatings and a safety profile that is highly advantageous over known refractory coatings. The preferred embodiment comprises an ester carrier, such as dimethyl carbonate or t-butyl acetate, to form a solvent based refractory coating composition.

In at least one preferred embodiment of the present invention, the ester solvent based refractory coating composition is formed as follows:

A refractory coating (also known as mold wash, paint, or dressing) composition provided in accordance with the present invention preferably comprises a liquid ester carrier, a suspending agent, a binding agent, water, and a particulate refractory filler blend. The liquid ester carrier is preferably primarily an organic compound that is colorless, flammable, and exempt from the restrictions placed on most VOCs in the United States. The liquid ester carrier is preferably classified as a carbonate ester, with or without the presence of a secondary solvent. The suspending agent is preferably a fine-grained natural rock or soil material that comprises one or more clay minerals with traces of metal oxides and organic matter. Examples of the suspending agent include palygorskite, montmorillonite, and sepiolite. The binding agent is preferably a copolymer having a chemical affinity to the liquid ester carrier in the presence or not of a secondary binding agent such as a natural rosin. The particulate refractory filler blend preferably comprises a fine to medium size fraction, the blend preferably having an average particle size of approximately d<30 microns, wherein no more than approximately 10% by weight or volume of the total particulate refractory filler blend has a particle size of approximately d<2 microns. Examples of the filler blend include zirconium silicate (also known as zircon) and/or aluminum silicate, graphite, silica, magnesium silicates, and the like, including combinations or blends of refractories.

In a preferred embodiment of the present invention, the liquid ester carrier is dimethyl carbonate ("DMC"). DMC has a similar flash point to IPA, and as such the light-off/burn properties of DMC are similar to IPA. Additionally, the evaporation rate of DMC is much higher than IPA or ethanol. Therefore, the drying times of refractory coatings comprising DMC are substantially less than traditional coatings comprising IPA or ethanol. This represents a significant advantage over traditional air dry applications.

Exemplary refractory coating compositions provided in accordance with the present invention preferably comprise: (i) a carrier DMC at approximately 25-100% wt of the carrier and IPA at approximately 0-75% wt of the carrier, wherein the carrier comprises approximately 20-80% wt of the coating composition; (ii) clays at approximately 2% wt maximum of the coating composition; (iii) a binder (i.e., a vinyl acetate and vinyl laurate copolymer in ethyl acetate, the copolymer provided at approximately 50% by weight of the binder), at approximately 1.5-3.0% wt of the coating composition; (iv) water at approximately 0-2% wt of the coating composition; (v) additives at approximately 0-2% wt of the coating composition; and (vi) a particulate refractory blend at approximately 13-78.5% wt of the coating composition.

It is contemplated that alternative liquid ester carriers may be used in refractory coating compositions provided in accordance with the present invention, including: t-butyl acetate, ethyl acetate, n-butyl acetate, allyl hexanoate, benzyl acetate, butyl butarate, ethyl butarate, ethyl benzoate, ethyl hexanoate, ethyl isovalerate, ethyl lactate, isobutyl acetate, isamyl acetate, ethyl ethanoate, n-butyl oleate, 2-ethylhexyl caprate/caprylate, isopropyl myristate, methyl oleate, n-propyl acetate, 2-ethylhexyl acetate, pentyl acetate, ethylene glycol diacetate (EGDA), 2-ethylhexyl acetate, isobutyl isobutyrate (IBIB), and propyl acetate.

The aforementioned ester carriers may also be used as VOC-exempt solvents for dilution of refractory coating compositions prior to application of the composition to a foundry article.

In another preferred embodiment of the present invention, the liquid ester carrier is t-butyl acetate.

For example, an alternative refractory coating composition provided in accordance with the present invention preferably comprises: (i) a carrier t-butyl acetate at approximately 52% wt of the carrier and IPA/Methanol/VM&P Naphtha at approximately 7.5% wt of the carrier; (ii) clays at approximately 1.7% wt maximum; (iii) a phenolic resin at approximately 0.4% wt; (iv) water at approximately 0.9% wt; and (vi) a zircon refractory blend at approximately 66% wt. Prior to application to a mold or core during production, this formulation is preferably diluted with t-butyl acetate to approximately 37% solids.

To form a refractory coating provided in accordance with the present invention, DMC, IPA, and water are first added to a mixing vessel at medium shear. Then, attapulgite clay (also known as palygorskite) is added and shear is increased to approximately 700 rpm for a blade diameter of 22 inches. The mixed materials form a gel after approximately 10 minutes of mixing. Refractory powders, such as a zircon blend, binder, additives, and remaining liquids if available are then added to the vessel and mixed together for approximately another 10 minutes. Blade action is ceased and the product is inspected for conformity with suitable refractory coating parameters.

In a preferred embodiment of the present invention, a method of using a refractory coating as described herein and provided in accordance with the present invention is as follows.

A refractory coating provided in accordance with the present invention may be applied to a foundry article, such as molds and cores, in variable ways due to variable substrates with which the coating is used, and also variable requirements of the user. The refractory coating of the present invention may be provided in a concentrated form. In all cases, the coating is applied to provide a protective barrier between a liquid metal and the mold or core.

Before application to the mold or core, the refractory coating is preferably diluted with an appropriate VOC-exempt solvent until the required application viscosity for the coating is achieved. Coatings of the present invention may also be applied absent any dilution, such as in a concentrated form, depending on the application and intended use of the coating. In a preferred embodiment of the present invention, the solvent is a liquid ester carrier comprising DMC. Once at the desired viscosity, the coating can be applied to the mold or core by several methods, including dip, spray, flood (flow coat), brush, swab, and mitt application methods. Dip application includes an immersing of the mold or core into the coating. This application allows full contact of the coating to all areas. Spray application is a blowing of the coating through the air in the form of tiny drops to form a coating layer on the surface of the mold or core. Flood application is a pumping of the coating through a hose to splash or flood onto the mold or core. The excess coating is collected and run again through the pump. Brush, swab, and mitt applications all use a tool (such as a paint brush, horse hair swab, or cotton mitt) soaked in the coating and contacted with the mold or core to apply the coating. Although these are the primary methods of applying a coating to a mold or core in the foundry industry, the invention is not limited to these applications, as will be appreciated by one of ordinary skill in the art.

In all applications, the wet refractory coating provided in accordance with the present invention is allowed to dry or ignited to remove the ester carrier. It is important to fully remove the ester carrier from the coating layer. If residual ester carrier remains, the ester carrier can be a source of gas which can cause defects in the metal casting.

In production, it has been found that refractory coatings formed in accordance with a preferred embodiment of the present invention comprising DMC achieved an approximately 50%-97% reduction in reportable VOC's as compared to conventional refractory coatings.

For example, a first production test includes a pouring of high alloy iron and high alloy steel castings with pouring weights of approximately 2,000-11,800 lb. Castings were poured using a vacuum process where a baseline refractory coating is sprayed onto a vacuum process mold film. A baseline coating comprising an IPA carrier was compared to two experimental refractory coating formulations provided in accordance with the present invention. The experiment coatings, Formula A and Formula B, both comprised an ester carrier and employed an approximately 1:1 ratio of DMC: IPA. The difference between Formula A and Formula B was the choice of binder employed therein. Formula A used a natural Binder A, such as gum rosin, and Formula B used a synthetic Binder B, such as vinyl acetate copolymer. Spray application of the Formula A and Formula B coatings was satisfactory as required thicknesses were developed. Dry times for the Formula A and Formula B coatings averaged 2 minutes while the baseline IPA coating dried in an average of 3 minutes and 30 seconds.

The molds were then filled with sand. The experimental formulas both exhibited sufficient sand erosion resistance. Once the mold was stripped from the pattern, it was observed that the baseline (IPA carrier coating) and Formula A exhibited similar coating cracking, while Formula B showed improved resistance to cracking of the coating layer. Per a practice appreciated by those of ordinary skill in the art, metal was then poured into the molds, the molds were allowed to cool, and castings were shot blasted before review. Both experimental Formulas A and B displayed acceptable casting performance. Moreover, both experimental coating displayed acceptable properties to produce a commercially viable casting.

The advantages of the experimental Formula A and B coatings include, but are not limited to:

Formula A: Approximately a 50% reduction in reportable VOCs and reduced drying time as compared to conventional refractory coatings.

Formula B: Approximately a 50% reduction in reportable VOCs, reduced drying time, and improved resistance to coating layer cracking as compared to conventional refractory coatings.

In a second production test, high alloy iron and high alloy steel castings were poured with pouring weights of approximately 2,000-11,800 lb. Castings were poured using the vacuum process where a refractory coating is sprayed onto the vacuum process mold film. A baseline coating comprising an IPA carrier was compared to two experimental refractory coating formulations provided in accordance with the present invention. An experimental formulation also formed in accordance with a preferred embodiment of the present invention, Formula C, was tested utilizing an ester carrier. Formula C employed an approximately 100% DMC carrier with the synthetic Binder B described above. Spray application of the Formula C coating was satisfactory as required thicknesses were developed. Dry times for Formula C averaged 1 minute and 30 seconds while the baseline IPA coating dried in an average of 3 minutes and 30 seconds.

The molds were then filled with sand. Formula C exhibited sufficient sand erosion resistance. Once the mold was stripped from the pattern, it was observed that Formula C showed improved resistance to cracking of the refractory coating layer. Per a practice appreciated by those of ordinary skill in the art, metal was poured, the molds were allowed to cool, and castings were shot blasted before review. Formula C displayed acceptable casting performance. Moreover, Formula C displayed acceptable properties to produce a commercially viable casting.

The advantages of the experimental Formula C coating include, but are not limited to:

Formula C: An approximately 97+% reduction in reportable VOCs, reduced drying time, and improved resistance to coating layer cracking as compared to conventional refractory coatings.

In another preferred embodiment of the present invention, a refractory coating was once again produced with a liquid ester carrier, a suspending agent, a binding agent, a dispersant, and a particulate refractory filler blend. The liquid ester carrier in this embodiment is dimethyl carbonate. The suspending agent is preferably a nanoclay, and more specifically an organo-modified clay. The nanoclay component is preferably montmorillonite, a 2-to-1 layered smectite clay mineral with a platey structure, and a surface modified to become organophilic with increased compatibility with the solvent of choice. The binding agent is preferably a copolymer having a chemical affinity to the liquid ester carrier. The dispersant agent is preferably an aromatic-free solution of a high molecular weight block copolymer with pigment affinic groups. The particulate refractory filler blend preferably comprises a fine to medium size fraction, the blend preferably having a medium particle size of approximately d<30 microns, wherein no more than approximately 10% by weight or volume of the total particulate refractory filler blend has a particle size of approximately d<2 microns.

Another exemplary refractory coating compositions provided in accordance with the present invention preferably comprise: (i) a carrier DMC at approximately 100% wt of the carrier, wherein the carrier comprises approximately 28.5-32.5% wt of the coating composition; (ii) organoclay at approximately 2% wt maximum; (iii) a binding agent, such as vinyl acetate copolymer, at approximately 1.5-3.0% wt; (iv) a block copolymer dispersant with pigment affinic groups at approximately 0-0.5% wt; and (v) a zircon refractory blend at approximately 66% wt.

To produce a refractory coating provided in accordance with the present invention, DMC, is added to a mixing vessel at medium shear. Then, the clay is added and shear is increased to approximately 700 rpm for a blade diameter of 22 inches. The mixed materials form a gel after approximately 10 minutes of mixing. Refractory powder(s), binder, and dispersant are then added to the vessel and mixed together for approximately another 10 minutes. Blade action is ceased and the product is inspected for conformity with suitable refractory coating parameters.

In another refractory coating composition formed in accordance with the present invention, Formula D was made comprising an approximately 100% DMC carrier and zircon refractory. In this example, the carrier is preferably 36.2% wt of the composition. This coating was tested under EPA Method 24 and found to have zero measurable VOCs with a <0.05% by weight detection limit. In production, Formula D was used to spray green sand molds in a high production foundry. The green sand molds are produced and require assembly within approximately 15 minutes to meet production needs. The Formula D coating is preferably completely dry before assembly to avoid gas related casting defects. Formula D is preferred in this application because foundries typically cannot permit for additional VOCs on such lines, so traditional solvent based options are disadvantageous because they result in emission of VOCs. Water based coatings would fit within the permitted standards for VOC emission, but these types of coatings will not dry within the required time before assembly (i.e., approximately 15 minutes or less). Although an acetone based coating would fit both dry time and permitting parameters, the low flash point deems this technology too much of a fire and explosion risk to utilize. VOC-exempt ester based coatings, such as Formula D, are therefore preferred and meets all VOC-exempt emission requirements. Specifically, the DMC based Formula D met all requirements. Formula D was produced and diluted to spray application baume with DMC. Mixing properties were acceptable for this application. Spray application properties were suitable for an even coat on the molds. Several large gray and ductile iron castings (500-5,000 lb) were poured. Casting results were substantially better than uncoated molds which resulted in significantly lower cleaning times.

A conventional solvent based paste coating may also be diluted with t-butyl acetate to achieve a reduction in VOC emission from the coating. The coating was diluted to typical flood coating or dipping viscosity (properties below at Table 1) and applied to a core. Application properties were acceptable for flood coating. Ignition properties were sufficient for drying without excessive heat to the core. Additionally and importantly, VOC emissions were reduced as a result of the dilution with t-butyl acetate. It is contemplated that other esters have a similar reduction of VOC emission.

TABLE 1

| | |
|---|---|
| Viscosity, cP | 500 |
| SOLIDS % | 40 |
| BAUME, deg | 37 |

We claim:

1. A method comprising a refractory coating composition for reduction of VOC content in a foundry article for metal casting, the method comprising the steps of: forming the foundry article, wherein the foundry article is a core and/or a mold; forming the refractory coating composition comprising a liquid carrier having an ester carrier; applying the composition to the foundry article; drying the composition to remove the ester carrier; wherein the composition comprises: the ester carrier being provided at 25% to 100% by weight of the liquid carrier and 20% to 80% by weight of the composition; a binder comprising a vinyl acetate and vinyl laurate copolymer provided 0.4% to 3% by weight of the composition; water provided at up to 2% by weight of the composition; one or more additives provided at up to 2% by weight of the composition; and a particulate refractory material provided at 13 to 78.5% by weight of the composition.

2. The method of claim 1, wherein the ester carrier is a carbonate ester.

3. The method of claim 1, further comprising the step of diluting the composition with a VOC exempt solvent.

4. The method of claim 1, wherein the ester carrier is t-butyl acetate or dimethyl carbonate.

5. The method of claim 2, the liquid carrier further comprising a volatile organic carrier.

6. The method of claim 2, wherein the binder is a vinyl acetate and vinyl laurate copolymer provided at 50% by weight of the binder.

7. The method of claim 2, wherein the additive is a wetting agent, defoamer, dispersant, or a rheology modifier.

8. The method of claim 2, wherein the particulate refractory material is a zirconium silicate flour having an average particle size of d<30 microns, and wherein no greater than 10% by weight or volume of the particulate refractory material has a particle size of d<2 microns.

9. The method of claim 1, further comprising an organoclay suspending agent, wherein the particulate refractory material is a zircon refractory blend, the binder is a copolymer binder and the foundry article comprises an aggregate.

* * * * *